H. HEUSER.
APPARATUS FOR MAKING ALCOHOL REDUCED BEVERAGES.
APPLICATION FILED NOV. 25, 1916.

1,277,931.

Patented Sept. 3, 1918.
2 SHEETS—SHEET 1.

H. HEUSER.
APPARATUS FOR MAKING ALCOHOL REDUCED BEVERAGES.
APPLICATION FILED NOV. 25, 1916.
1,277,931.
Patented Sept. 3, 1918.
2 SHEETS—SHEET 2.
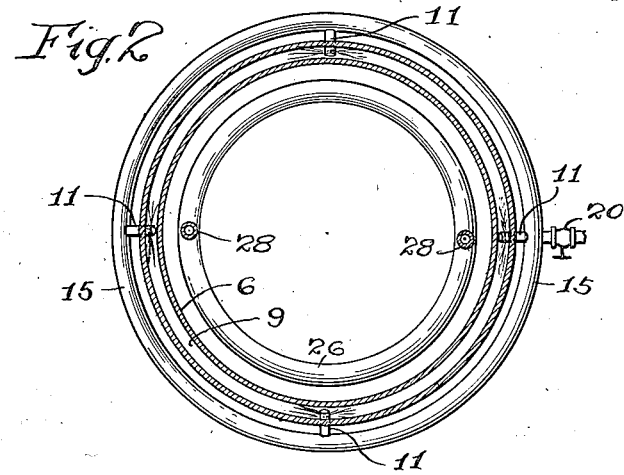
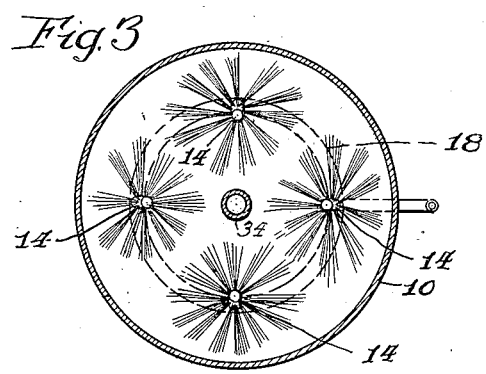
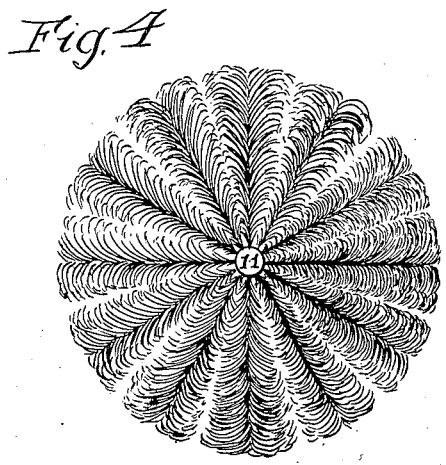
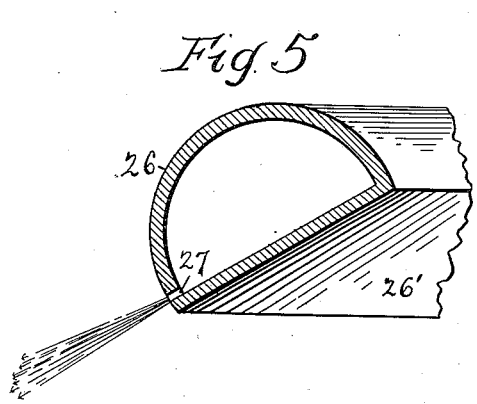

UNITED STATES PATENT OFFICE.

HERMAN HEUSER, OF CHICAGO, ILLINOIS.

APPARATUS FOR MAKING ALCOHOL-REDUCED BEVERAGES.

1,277,931.　　　　　Specification of Letters Patent.　　Patented Sept. 3, 1918.

Application filed November 25, 1916. Serial No. 133,506.

*To all whom it may concern:*

Be it known that I, HERMAN HEUSER, a citizen of the United States, residing at Chicago, in the county of Cook and State of Illinois, have invented certain new and useful Improvements in Apparatus for Making Alcohol-Reduced Beverages, of which the following is a specification, reference being had therein to the accompanying drawing.

My invention relates to the manufacture of alcohol-reduced beverages, and in particular to that stage of their manufacture which deals with the removal or reduction of the alcohol in any kind of beverages. It consists in an apparatus for flowing the alcoholic beverage in a thin film over a vertical or inclined heating surface and instantaneously transmitting to each successive portion of the beverage in the flowing film the large volume or quantity of heat contained in pressure steam in the form of latent heat to momentarily boil the beverage in the flowing film at high temperatures above those ordinarily detrimental to the quality of the beverage to instantaneously reduce its alcohol content during its passage over such surface without impairing its quality.

In the accompanying drawings Figure 1 represents an apparatus embodying the various features of my present invention, the view being partly in section and partly in elevation;

Fig. 2 is a detail sectional view looking in the direction of the arrows on the line 2—2 of Fig. 1;

Fig. 3 is a detail sectional view on the line 3—3 of Fig. 1;

Fig. 4 is a detail view illustrating the spraying action of one of the steam injectors or inlets, being on an enlarged scale, and Fig. 5 is a detail sectional view of the beverage-supply pipe.

Figure 1:
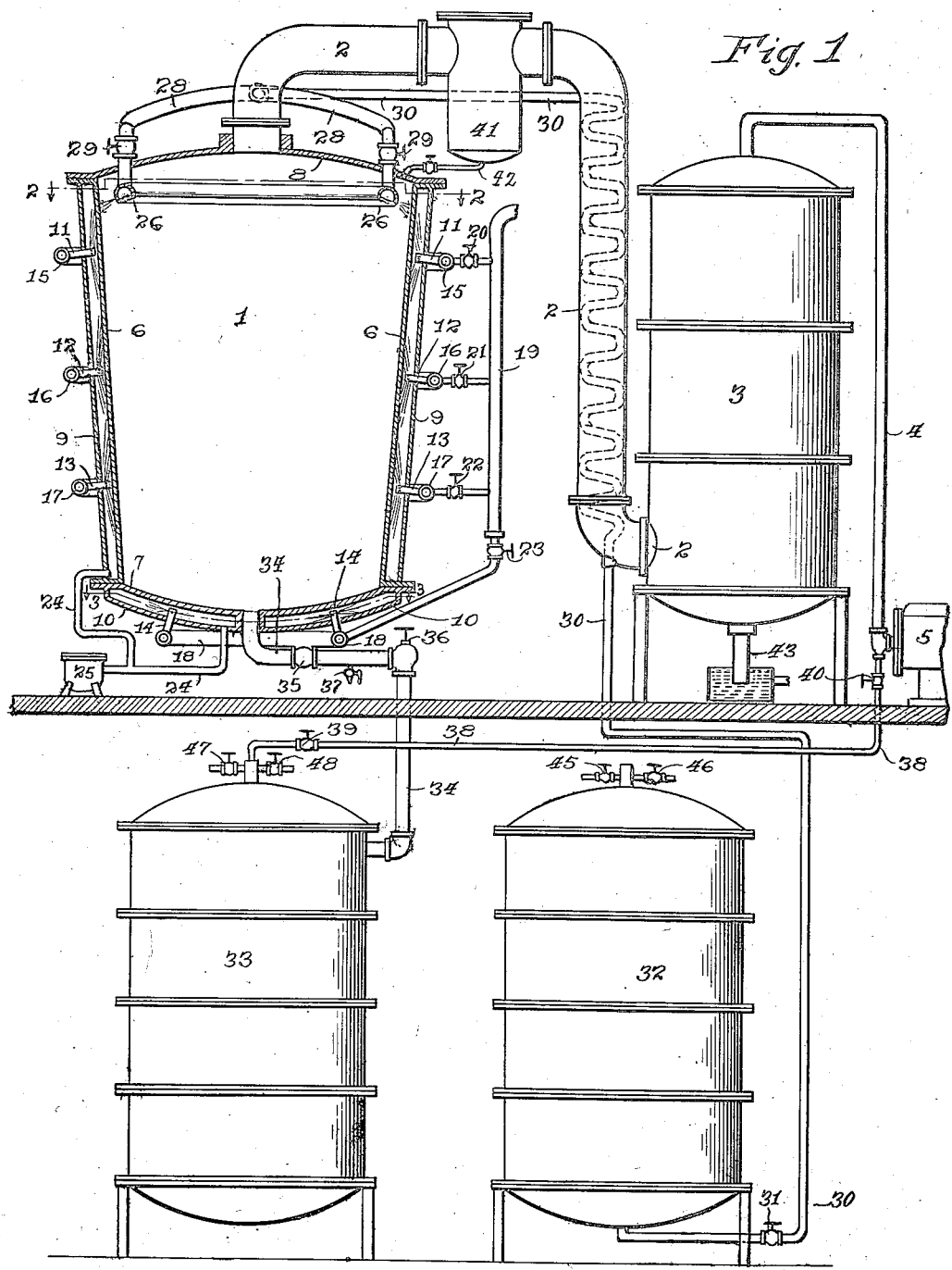

In the drawings the reference numeral 1 indicates an evaporating chamber, preferably a vacuum pan which is connected by its vapor tube 2 to a condenser 3 which is of the barometric injection type and is connected by pipe 4 to a dry-vacuum pump 5.

The chamber 1 consists of a vertical cylindrical shell 6, which preferably is slightly greater in diameter at its top so that its walls are inclined, a dished bottom 7 and a dished top 8. The shell is provided with a steam jacket 9, and the bottom with a separate steam jacket 10; the jackets do not communicate with each other, and each is provided with a number of steam inlets. The steam inlets are arranged in banks or units, the banks for the shell jacket being at different levels and numbered respectively 11, 12 and 13, and the bank for the bottom jacket being numbered 14. The steam-inlets of each bank are connected to the same ring-shaped header, the inlets 11 to header 15, inlets 12 to a header 16, inlets 13 to a header 17, and inlets 14 to a header 18, and each of the units can be independently operated as its supply pipe leading from the source of steam supply 19 has a control-valve, these valves being numbered 20, 21, 22, and 23, respectively. This unit arrangement of steam inlets effects a uniform distribution of the steam, and the spaced arrangement of the units along the length of the chamber enables me to use them separately or in series as desired to increase or decrease the zone of evaporation. To increase the uniformity of the steam distribution the various inlets are laterally perforated at their terminals in the jackets in such a way that the steam does not flow direct against the inner jacket wall, but diffuses and spreads out between the jacket walls, as shown for example in Fig. 4. Thus the perforations do not point or lead against the inner walls of the jacket, but radiate from the steam terminals to discharge the steam parallel to the walls. The steam jackets are provided with condensed-steam pipes 24 to carry the condensation to trap 25.

In the upper portion of the chamber, preferably on the level with the rim of its shell and close to the shell, an annular spray pipe 26 is placed parallel to the rim, and is provided with numerous small lateral perforations 27 on its outer periphery pointing to the shell, in the general direction of the arrows of Fig. 5. The pipe 26 is connected by branch feed pipes 28 having valves 29 and leading to the supply pipe 30, which is equipped with a valve 31 and leads to the storage tank 32 of the fermented beverage to be treated.

The central lower portion of the bottom of the chamber communicates with the receiver 33 for the alcohol-reduced beverage by means of discharge pipe 34 equipped with valves 35 and 36. The pipe section between the valves 35 and 36 is provided with a spigot 37 for taking samples during the process, after the two valves have been shut during the time the sample is being taken. The receiver 33 communicates with the vacuum pump 5 by a pipe 38 equipped with valves 39 and 40. The top of the pan is provided with the usual bull's eyes for the insertion of the electric lights, and with the observation glasses and the manhole door, which are not shown in the drawing. If desired the vapor pipe 2 may be provided with a separator 41 for particles of beverage carried out by the vapor, which is provided with a valved return pipe 42 leading back to the chamber. The condenser may have the usual barometrical discharge tube 43. If desired the storage tank 32 may be provided with air valves 45 and 46, and the receiver 33 with air valves 47 and 48, for admitting or venting air.

The device operates as follows:—

Valves 39 and 40 of pipe 38 and valves 35 and 36 of pipe 34 are opened, and the vacuum pump and condenser are put in operation, and when the desired vacuum has been obtained in the system some or all of the steam-valves 20, 21, 22, and 23 are opened together with valve 31 in the beverage-supply line. Thus simultaneously with the entrance of the live steam into the jackets 9 and 10, beer (for example) from the storage tank 32 enters through the supply pipes into the annular distributing pipe 26, being drawn into the latter by suction as the vacuum in the pan is large enough to lift the beer sufficiently for this purpose. The distributing pipe 26 emits or discharges the beer in the direction of the arrows and distributes it uniformly in a flowing film or sheet over the interior surface of the chamber. During the flow of the beer along the shell and dished bottom the steam is radially discharged in all directions between the walls of the steam jackets and uniformly gives off its heat to the beer, changing the same into vapors in proportion as the steam condenses. Enough steam is admitted to keep the flowing beer in a state of boiling; preferably the apparatus is operated with a vacuum in order to recover the alcohol, but it may be used at atmospheric pressure by omitting the vacuum producing means. As the vapors containing the alcohol arise, they are carried off through tube 2 and at their arrival in condenser 3 they are condensed and then discharged through any suitable barometrical tube attached to the bottom of the condenser. The dealcoholized beer at its arrival at the base of the bottom of the pan flows through pipe 34 into the receiver 33, where it is held under vacuum until the desired quantity of beer has been dealcoholized. The discharge or flow of the beer from the pan proceeds without interruption, even when it is so large that the pipe 34 is filled with beer, because the vacuum in the receiver 33 is kept up to the proper point through the pipe 38, and any difference in vacuum in the pan and receiver would be in favor of the vacuum in the receiver being slightly higher than the vacuum in the pan on account of the absence of evaporation in the receiver and its direct communication with the pump.

The extent to which the alcohol is evaporated from the beer is controlled by regulating the quantity of steam emitted into jackets 9 and 10 by their steam supply units. If the alcohol reduction is to be carried on to the point where the beer contains a little less than one-half of one per cent. of alcohol by volume, the upper two steam units will usually deliver ample steam for evaporation, provided the beer does not flow too fast from the storage tank into the pan, and the lower two units may be closed during the process. But if the flow of beer to the pan is increased one or both of the other steam units may be used. When the beer is to be completely dealcoholized the third unit from header 17 is also used, and to insure that no trace of alcohol is left in the alcohol-reduced beer the bottom unit from header 18 is likewise put in operation. When only the steam units of the shell-jacket are used, the bottom of the pan is not in the evaporating zone.

The utilization of the vacuum in the pan for the purpose of furnishing the power for supplying the beverage to the pan is of advantage as then the flow of beer into the pan stops the moment the vacuum in the pan is broken. There are many reasons why this latter may happen, and when it happens any further entrance of the beverage into the pan would be not only purposeless but also detrimental to the beverage, because it will not be dealcoholized and therefore will increase the alcohol content of the beverage in the receiver.

From time to time during the process a sample may be taken from spigot 37 and tested as to its reduction in alcohol, and as the taking of a sample from the section of the discharge pipe 34 between the valves 35 and 36 requires only a momentary closing of these valves it will not interfere with the substantial continuity of the process and may be done frequently without danger to the beverage.

While in ordinary practice the dealcoholization proceeds at a very slow rate, by the present invention it is very rapid, being instantaneous in the beverage in the boiling zone and continuous in point of time, whether the beverage is to be only partly or wholly dealcoholized. The pressure steam, whether live or exhaust, strikes the condensing surface of the boiling zone at very high speed and maintains against the surface throughout the boiling zone the large amount of latent heat necessary to provide for the rapid and large exchange of heat units continuously absorbed by the flowing beverage to maintain it in the boiling state, and as the steam is kept in a state of instantaneous and continuous condensation uniformly throughout the boiling zone by its constant contact with the condensing surface afforded by the wall of the evaporator the large quantity or volume of high heat contained in the steam in the form of latent heat is instantaneously and continuously liberated and transmitted to the successive portions of the beverage in the flowing film, so that the exposure of each successive portion of the beverage to the boiling action is so momentary or reduced in time that its quality is not affected even when the boiling temperature in the flowing film is much above those ordinarily detrimental to the beverage. For example, I have found that in practice with my invention the beverage is not impaired when the temperature in its flowing film in the boiling zone is at 212° Fahrenheit. This is especially advantageous because in dealcoholizing beer for example its quality as a beverage decreases whether it is dealcoholized at atmospheric pressure or under a vacuum; for the various dealcoholizations of the same beer at the same temperatures and by the same method or process this decrease in quality is in accurate proportion to the increase in time used for the evaporation of the alcohol, and the decrease in quality increases with the increase in time more rapidly at higher temperatures than at lower temperatures. Further by my invention the alcohol content is rapidly evaporated as only a thin film of the beverage descending over the heating surface is exposed to the boiling action, and the quality of the beverage is not materially affected as it is only momentarily exposed to the action of heat and then the alcohol-reduced beverage is carried out of the zone of evaporation; each portion of the beverage passes rapidly through the apparatus and without the necessity of checking or impeding its flow, and successive portions of the beverage pass through the boiling zone in an uninterrupted manner to provide continuous treatment for an unlimited amount. Also, my invention practically eliminates the formation of foam or froth, which seriously interferes with the customary distillation of alcohol from foam-producing beverages, such as beer, because in boiling such beverages the formation of foam increases with reductions in the boiling temperature or increases in the vacuum, but as my invention makes possible the use of high temperatures without injury to the beverage it diminishes the foam to a negligible quantity that does not interfere with the operation or require large apparatus to accommodate a large foam-volume. Furthermore, by suppressing the foam-formation the foam-producing materials in the original beverage are preserved intact in the dealcoholized product so that this latter does not require subsequent treatment to impart to it the qualities of foam-production and foam-stability.

While the beer foams slightly at its discharge on the heating surface from the disengagement of $CO_2$, the foam has time to subside during its descent on this surface, and therefore is entirely dealcoholized like the rest of the beverage.

Similarly, the volume of vapors arising from the boiling of beverages, especially those containing carbonic acid, such as beer, increases with reductions in the boiling temperature or with increases in the vacuum, excessively large volumes of rarefied vapors being thus produced under such conditions, but as my invention enables the boiling to take place at high temperatures without injury to the beverage it greatly reduces the volume of the vapors and thereby makes it possible to reduce the size of the apparatus and so the expense of its construction, installation and operation. An apparatus of the former type would be impractical for commercial removal of alcohol as it would be prohibitive in size, and the auxiliary apparatus required to take care of large volumes of vapor would be proportionately large, while by my apparatus providing for instantaneous dealcoholization by boiling at high temperatures without detriment to the quality of the beverage the volume of vapors is so reduced that the size of an evaporator for continuous dealcoholization of an unlimited quantity of beer is reduced to a minimum and all auxiliary apparatus to take care of the vapor is correspondingly reduced.

Also my invention may be employed on the premises of a brewery, when the present U. S. Internal Revenue Regulations do not permit the collection of alcohol. However, where there is no objection against the collection of alcohol in the manufacture of alcohol-reduced beer on the premises of a distillery, suitable means for alcohol collection may be readily provided.

It is advantageous to utilize the latent heat in the vapor to initially raise the temperature of the inflowing beverage as it is supplied to the evaporator, and for this purpose the beverage feed-pipe 30 passes into and along the vapor tube 2, being arranged in coils therein. The vapors precipitated on the feed-pipe in the vapor tube flow as water into the condenser to be discharged as water together with the other condensations. For example, the heating of the beverage on its way to the vacuum pan considerably decreases the amount of steam necessary for boiling it, and as this heating is done by vapors arising from the boiling beverage a considerable saving in fuel for the production of the steam and a considerable saving in water necessary for precipitating the vapors in the condenser take place.

The annular feed pipe 26 is preferably shaped in cross-section as shown in Fig. 5, its lower surface 26' being downwardly and outwardly inclined and the discharge openings 27 being at the bottom of the incline to facilitate the flow of the beverage and emptying the pipe, and the openings being relatively small in comparison with the area of the pipe produce a head in the latter to eject the beverage against the wall of the pan.

I make no claim in the present application to a process of manufacturing alcohol-reduced beverages, which may be carried out with the herein disclosed apparatus, among others, as the same constitutes the subject-matter of my divisional application filed February 24th, 1917, bearing Serial Number 150,641, of the series of 1915.

I claim:—

1. In a device of the class described, a vertical evaporator having a vapor outlet in its top and a liquid outlet in its bottom, a liquid sprayer located in the upper end of the evaporator to discharge a film of liquid on the inner surface thereof near said end, a jacket for said evaporator, and a bank of pressure steam injectors in said jacket to diffuse steam therein against the outer surface of the evaporator to instantaneously and continuously liberate and transmit to the beverage a large quantity of high heat to form a boiling zone to momentarily boil the beverage in the flowing film.

2. In a device of the class described, a vertical evaporating chamber provided with a vapor outlet on its top and a liquid outlet in its bottom and having its diameter gradually reduced toward its lower end, a liquid sprayer located in the upper end of the chamber to discharge a film of liquid on the inner surface thereof near said end, a jacket for said chamber, and steam injectors in said jacket to diffuse pressure steam therein, to instantaneously and continuously liberate and transmit to the beverage a large quantity of high heat to form a boiling zone to momentarily boil the beverage in the flowing film.

3. In a device of the class described, a vertical evaporator having a vapor outlet in its top and a liquid outlet in its bottom, a liquid sprayer located in the upper end of the evaporator to discharge a film of liquid on the inner wall thereof near said end, a jacket for said evaporator, and steam injectors in said jacket having lateral discharge nozzles to diffuse pressure steam therein, to instantaneously and continuously liberate and transmit to the beverage a large quantity of high heat to form a boiling zone to momentarily boil the beverage in the flowing film.

4. In a device of the class described, a vertical vacuum pan having a vapor outlet and a liquid outlet, a liquid sprayer located at the upper end of said pan to discharge a film of liquid thereon, a jacket for said pan, a plurality of banks of steam injectors at different levels in said jacket to diffuse steam therein, and means to control the steam supply to each of said banks of injectors.

5. In a device of the class described, a vertical vacuum pan having a curved bottom, a vapor conducting tube connected with the pan, a liquid sprayer located in the upper end of said pan to discharge a film of liquid on the inner wall thereof near said end, a jacket for said pan, a jacket for said curved bottom, steam injectors in said jackets to diffuse steam therein, and means to separately control the steam supply to said injectors.

6. In a device of the class described, a vertical vacuum pan having a vapor outlet and a liquid outlet, a liquid sprayer located at the upper end of said pan to discharge a film of liquid thereon, a jacket for said pan, a plurality of banks of steam injectors in said jacket having lateral discharge nozzles to diffuse pressure steam therein to instantaneously and continuously liberate and transmit to the beverage a large quantity of high heat to form a boiling zone to momentarily boil the beverage in the flowing film, and means to control the steam supply to said banks of injectors.

7. In a device of the class described, a vertical vacuum pan having a curved bottom, a vapor conducting tube connected with the pan, a liquid sprayer located in the upper end of said pan to discharge a film of liquid on the inner wall thereof near said end, a jacket for said pan, a jacket for said curved bottom, steam injectors in said jackets having lateral discharge nozzles to diffuse pressure steam therein to instantaneously and continuously liberate and transmit to the beverage a large quantity of high heat to form a boiling zone to momentarily boil the beverage in the flowing film, and a liquid outlet in said bottom.

8. In a device of the class described, a vertical vacuum pan having a vapor tube, a liquid sprayer located at the upper end of said pan to discharge a film of liquid thereon, a jacket for said pan, and steam injectors in said jacket, the sprayer having its lower wall downwardly and outwardly inclined and its discharge openings at the bottom of the inclined wall.

9. In a device of the class described, a vertical evaporator having a vapor outlet in its top and a liquid outlet in its bottom, a liquid sprayer located in the uper end of the evaporator to discharge a flowing film of liquid on the upper portion of one surface thereof, a steam jacket, and means to diffuse pressure steam in the jacket against the opposite surface of said evaporator to instantaneously and continuously liberate and transmit to the beverage a large quantity of high heat to form a boiling zone to momentarily boil the beverage in the flowing film.

In testimony whereof I affix my signature in presence of two witnesses.

HERMAN HEUSER.

Witnesses:
J. McRoberts,
Edith Wilcox.